Dec. 28, 1965 H. B. CAPWELL 3,225,814
SPEED AND ACCELERATION REGULATOR
Filed Sept. 27, 1963 3 Sheets-Sheet 3

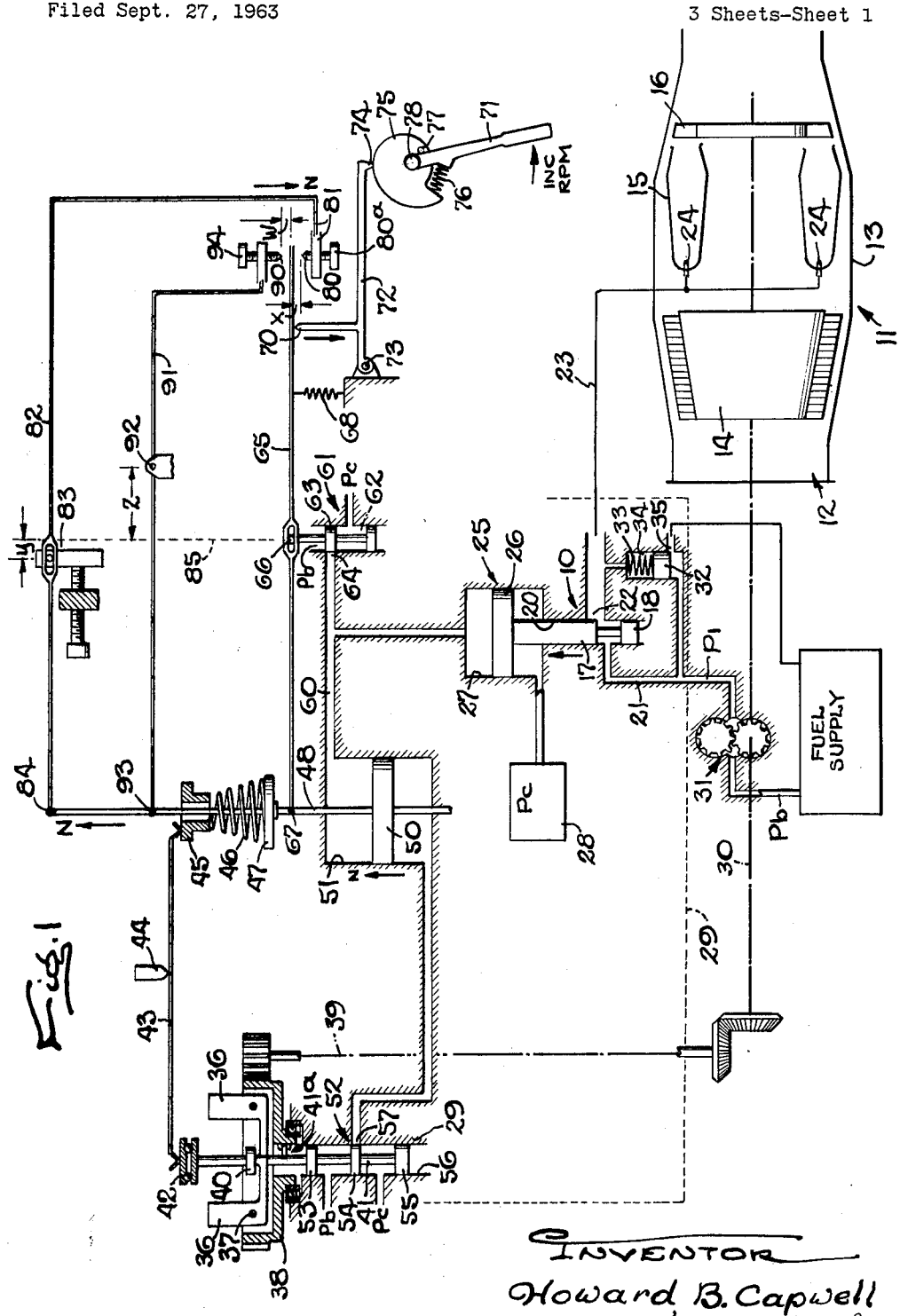

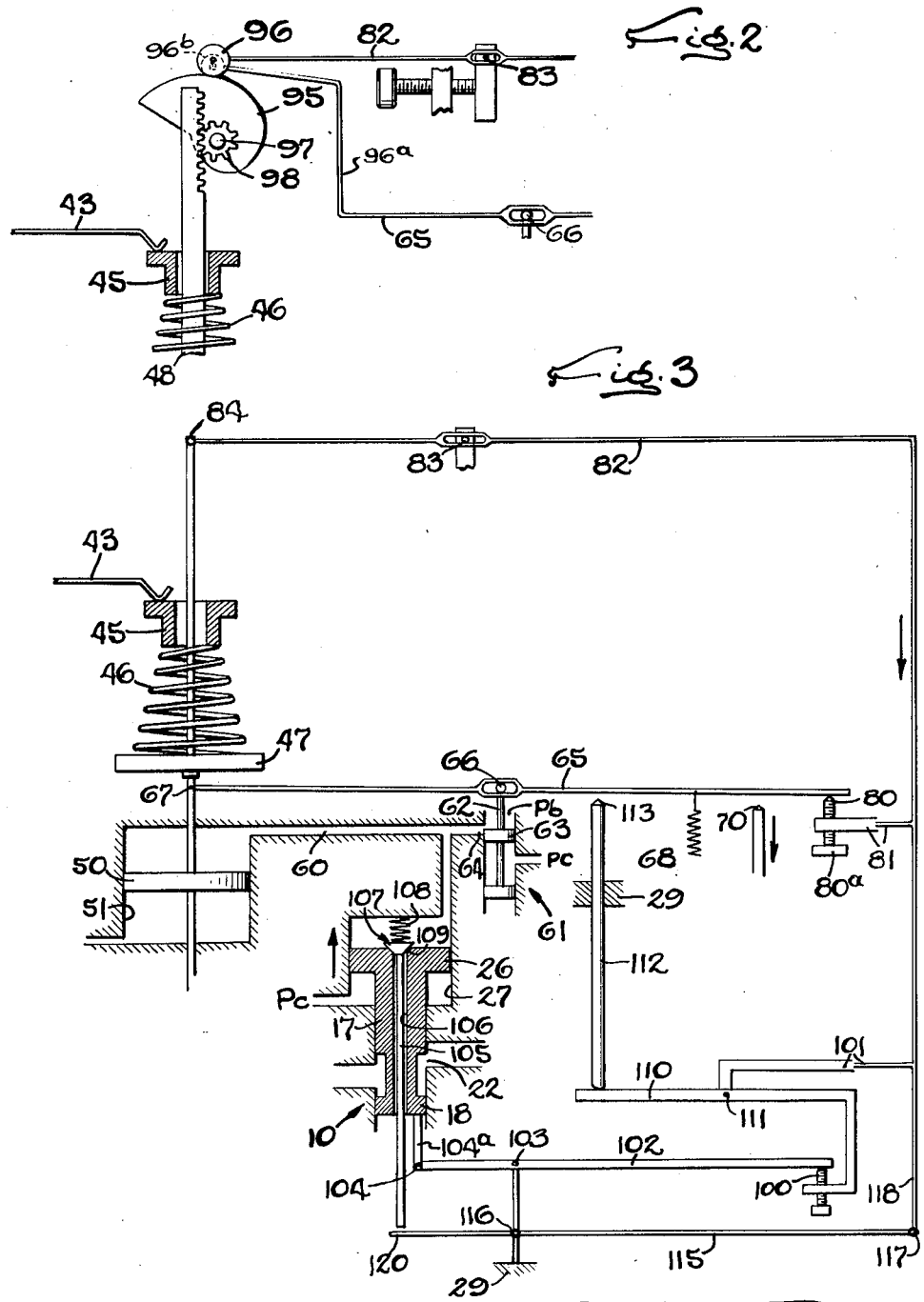

INVENTOR
Howard B. Capwell
By Wolfe, Hubbard, Voit & Osann
ATTORNEY

United States Patent Office 3,225,814
Patented Dec. 28, 1965

---

3,225,814
SPEED AND ACCELERATION REGULATOR
Howard B. Capwell, Rockford, Ill., assignor to Woodward Governor Company, Rockford, Ill., a corporation of Illinois
Filed Sept. 27, 1963, Ser. No. 312,102
26 Claims. (Cl. 158—36.4)

This invention relates to the automatic regulation of the speed and acceleration of a prime mover such as a gas turbine whose operation or service lift may be affected adversely by acceleration at greater than a predetermined maximum rate. In another aspect, the invention relates to a speed governor which operates isochronously, that is, at constant speed under steady-state conditions and at different selectively adjusted speed settings.

The general object is to provide a speed and acceleration regulator of the above character which, as compared with prior combination regulators, is much simpler in construction, lower in cost, more flexible in adjustment, smaller in size and weight, more universally applicable to present-day prime movers, and yet is easily adjustable for isochronous steady-state operation at different speeds independently of the prime mover load.

A second general object is to provide an acceleration limit regulation which, without alteration or adjustment, is suitable for controlling gas turbines burning fuels having widely varying heating values and operating with or without regenerators for preheating the burner inlet air.

Another object is to utilize the changing position of a high droop proportional type speed sensor as a long range indication of a permissible rate of acceleration and to control the delivery of fuel to the prime mover in accordance with a preselected schedule.

A further object is to control the acceleration regulating action through the medium of a reset device which normally coacts with the primary controller below the acceleration limit to maintain isochronous steady-state operation of the prime mover.

Still another object is to utilize the acceleration regulating mechanism to also control the rate of deceleration of the prime mover.

The invention also resides in the novel manner of varying the acceleration limit schedule.

A further object is to provide for adjustment of the acceleration regulator and the fuel schedule automatically with changes in one or more parameters that affect the prime mover operation.

Other objects and advantages of the invention will become apparent from the following detailed description taken in connection with the accompanying drawings, in which FIGURE 1 is a simple schematic view and circuit diagram of an acceleration regulating prime mover control embodying the novel features of the present invention.

FIG. 2 is a view of part of FIG. 1 modified to provide a non-linear acceleration schedule.

FIG. 3 is a modification of a part of FIG 1.

Figure 4:
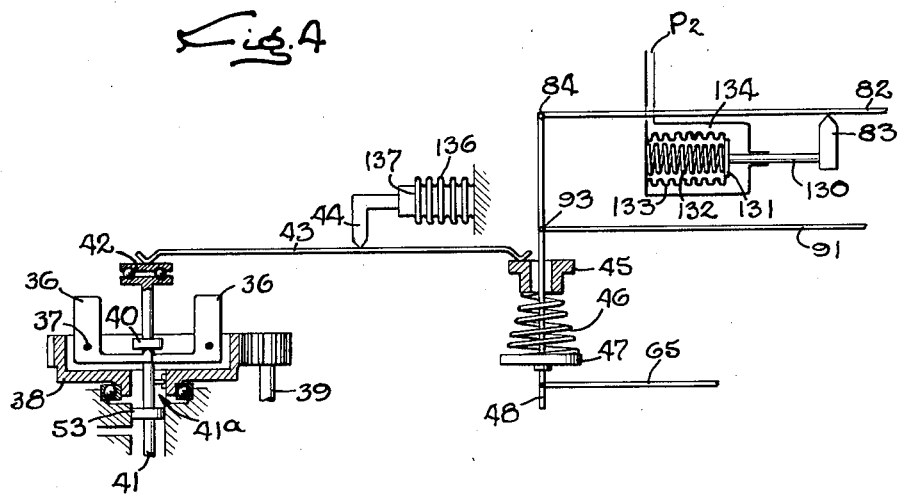
FIG. 4 is another modification.

Modern gas turbines are typical of those prime movers whose operation is likely to be affected adversely by too rapid acceleration or deceleration. Accordingly, the invention is shown for purposes of illustration incorporated in a governor for maintaining constant speed operation of such a gas turbine 11 by variably positioning a valve 10 which regulates the flow of fuel to the turbine burners. In such prime movers, air entering the inlet 12 of an elongated casing 13 passes successively through the rotor of a compressor 14, a combustion chamber 15 and the blades of a turbine 16 before being discharged from the outlet of the casing.

Herein, the fuel valve 10 comprises spaced lands 17 and 18 slidable in a bore 20 communicating with a fuel supply passage 21 at a pressure P1 and having an outlet port 22 communicating through a pipe 23 with the burner nozzle 24 and variable in area according to the axial position of the land 17. The position of the latter and the rate of fuel delivery are determined by the position of a reversible power actuator or servo 25 comprising in this instance a piston 26 fixed to the land and slidable in a cylinder 27 whose rod end communicates with a suitable source 28 of hydraulic fluid maintained at a constant control pressure Pc, the valve thus being biased in the fuel-increasing direction. The valve and the parts governing its operation are designed to fit compactly within a fluid filled casing 29 indicated by the dotted enclosure and the hatching in the drawing and attached to the exterior of the turbine whose shaft is coupled to a main pump 31 which delivers fuel at the high pressure P1. By the usual so-called boost pump driven by the turbine, fuel is supplied at relatively low pressure Pb to the pump inlet which also communicates with the regulator casing.

To provide an approximately constant pressure drop across the fuel valve 10, the supply pressure P1 and the burner pressure are exerted on opposite ends of a piston 32 loaded by a spring 33 and slidable in a cylinder 34 and cooperating with a port 35 therein to form a valve for by-passing fuel out of the supply line 21 and to the pump inlet.

The arrows applied to the drawings indicate in each instance the direction of an increase of motion or a parameter.

In the present speed governor, the sensor for detecting variations in the speed of the gas turbine is of conventional construction comprising upstanding L-shaped flyweights 36 fulcrumed at 37 on a ball-head 38 journaled in the casing 29 and driven through a connection 39 with the shaft 30 of the turbine. Inwardly projecting toes on the flyweights bear upwardly against a flange 40 on a stem 41 which projects through the ball-head and at its upper end carries the lower race of an anti-friction bearing 42. Through a suitable coupling 41a the stem rotates with a ball-head. The upper race of the bearing 42 bears upwardly against one end of a lever 43 which extends horizontally and is supported intermediate its ends on a fulcrum 44. At its other end, the lever bears downwardly against a ring 45 abutting against the upper end of a conventional non-linear compression type speeder spring 46. The latter is seated on a disk 47 fast on the rod 48 of a piston 50 having opposite ends of equal areas and slidable in a cylinder 51 with which the piston cooperates to form a reversible hydraulic servo.

The flow of hydraulic fluid into an out of the lower end of the cylinder 51 is controlled by a valve 52 herein comprising lands 53, 54 and 55 axially spaced along the lower end portion of the stem 41 slidable within the bore 56 of the casing 29. The land 54 is of substantially the same axial length as and cooperates with a port 57 at the inner end of passage continuously communicating with the lower end of the cylinder 51.

In the condition of steady-state speed equilibrium, the centrifugal force developed by the rotating flyweights balances the force of the reference spring 46, the land 54 being centered on port 57 as shown in FIG. 1. With valve 52 thus closing the passage to the lower end of the cylinder 51, the position of the piston 50 is fixed. When the prime mover speed rises, the flyweights 36 move outwardly lifting the land 54 above the port 57 to open the valve 52 and admit fluid from Pc to the cylinder 51 beneath the piston 50. The latter is thus raised carrying the spring abutment 47 upwardly and correspondingly compressing the reference spring 46 thus generating a force differential in opposition, through lever 43, to the rising flyweight force which tends to recenter the valve 52. This process continues with the valve 52 remaining slightly open, in a magnitude proportional to the acceleration rate, as long as the speed continues to rise and terminates with the closure of the valve 52 when the speed reaches equilibrium or momentarily ceases to vary. Conversely, when a decrease in the speed of the turbine is detected, the flyweights move inwardly lowering the land 54 to open the valve 52 in a direction to connect the cylinder 51 to the low pressure line Pb thus releasing fluid from the servo until the feedback lever has restored the land 54 to the centered position thus reclosing the valve.

It will be apparent from the foregoing that the fly-balls, the spring 46, the valve 52, the servo 50, 51 and the feedback lever 43 constitute a tachometer for continuously measuring the changing speed of the turbine and giving an accurate indication, that is, the position of the piston 50 and rod 48, of the prevailing speed. The back and forth movements of the tachometer piston 50 result in displacement or movement of oil into and out of the upper end of the cylinder 51 which communicates through a passage 60 with the upper end of the cylinder 27 of the fuel servo 25. As a result of a detected increase in turbine speed, oil is forced into the servo 25 when the pressure in the passage 60 rises above the pressure biasing the piston 26 upwardly. This moves the fuel valve land 17 toward closed position to decrease the fuel supply and reduce the turbine speed. Since the fuel servo piston 26 is biased by a constant hydraulic pressure Pc, this piston moves back and forth in accordance with the corresponding flows of fluid in the passage 60. If the piston 26 were biased by a spring whose force varies with the movement of the piston, the latter would move in accordance with pressure changes resulting from changes in the flow in the passage 60.

In a similar way, a detected reduction in the turbine speed results in lowering the land 54 relative to the port 57 and the release of pressure fluid from the lower end of the cylinder 51 so that, under the upward biasing pressure exerted on the fuel servo piston 26, the latter is allowed to move upwardly thus increasing the fuel supply by an amount corresponding to the lowering of the tachometer piston until the pilot valve again becomes closed. Conversely, a detected increase in speed causes raising of the pilot valve stem 41, admission of pressure fluid to the cylinder 51 and upward movement of the piston 50 and the displacement of fluid thereby into the servo 25 to initiate closing of the fuel valve. The fuel decrease is terminated when the pilot valve becomes reclosed through the feedback lever 43.

It will be apparent that under the control of the tachometer alone the fuel valve 10 will be adjusted in proportion to the detected changes in the turbine speed and thus providing a true proportioning control having inherent speed droop. To dissipate this inherent droop and provide for true isochronous or constant speed operation of the turbine, provision is made for continuing the change in fuel supply following each speed deviation detected by the tachometer until the turbine speed has been restored to its preselected value under the load condition causing such speed change. Such so-called resetting action is accomplished in the present instance by a valve 61 controlling the admission of pressure fluid to or the release from the passage 60 and therefore the position of the fuel servo 25 by varying the pressure opposing the upwardly directed biasing pressure on the piston 26. In the form shown, the reset valve comprises a stem 62 carrying a land 63 cooperating with a port 64 to close the passage 60 when the land is centered on the port as shown in FIG. 1. Raising of the stem above the centered position uncovers the port to admit oil at the pressure Pc to the passage 60 thus increasing the pressure on the servo piston 26 to decrease the opening of the fuel valve 10. Conversely, lowering of the valve stem 62 opens the port 64 to the drain or low pressure area Pb thus releasing fluid from the passage 60 and allowing a corresponding increase in the opening of the fuel valve under its biasing force.

The reset valve is actuated in response to movement of the output member 48 of the speed sensor or tachometer. In the form shown, this is accomplished through the medium of a horizontally disposed lever 65 pivotally connected at 66 intermediate its ends to the valve stem 62 and pivotally connected at 67 to the tachometer output member 48. A spring 68 acts continuously to urge the stem 62 in the fuel-increasing direction, the extent of such movement being determined by the position of a fulcrum 70.

In accordance with one aspect of the present invention, the isochronous speed at which the turbine is operated is determined by the vertical position of the fulcrum 70 which may be adjusted manually to vary the position of the tachometer piston 50 required to center the land 63 of the reset valve on the port 64. For a purpose to appear later, the fulcrum 70 comprises a stop adapted for abutting engagement with the lever 65 at the end thereof opposite the pivot 67 and selectively adjustable manually by swinging a throttle lever 71 to select the isochronous speed at which the turbine operation is maintained. The stop 70 is carried by a lever 72 fulcrumed at 73 with its other end 74 constituting the follower of a rotary cam 75 fast on a shaft 78 on which the throttle lever 71 is loosely fulcrumed, a compression spring 76 normally biasing the lever angularly against a stop 77 on the cam. With this arrangement, the stop 70 will be raised and lowered in response to swinging of the throttle lever counter-clockwise and clockwise respectively thus correspondingly increasing and decreasing the speed setting of the governor.

During steady-state operation and when the prime mover is operating at the speed determined by the position of the throttle 71, both the tachometer and reset valves 52 and 61 will be closed and fluid in the passage 60 and in both ends of the cylinder 51 will be compressed under the upward biasing force constantly exerted on the servo piston 26. Then, in response to a decrease in load, the prime mover speed will increase and the flyweights will swing outwardly thus raising the valve stem 41 against the force of the spring 46 to uncover the lower part of the port 57. Fluid at Pc flows through this port into the lower end of the cylinder 51 forcing the piston 50 upwardly to displace fluid out of the upper end of the cylinder 51 through the passage 60 and into the cylinder 27. The biasing force on the piston 26 is thus overcome and the latter is moved downwardly thus reducing the opening of the fuel valve and the flow of fuel to the prime mover. The upward movement of the piston 50 increases the compression of the speeder spring 46 and is fed back through this spring and the lever 43 to the valve stem thus lowering the land 54. Such lowering continues until the land has been recentered on the port 57 thus closing the valve 52 and momentarily interrupting the movement of the piston 50 with the latter in a new position corresponding to the changed engine speed.

The upward movement of the tachometer piston is also transmitted to the lever 65 which is swung about the speed selector stop 70 as a fulcrum thus raising the stem 62 and the land 63 to open the reset valve 61 in a direction to admit oil at Pc to the passage 60 at a rate corresponding to the movement of the piston 50 in recentering the pilot valve 52. Since the position of this piston is then fixed by the then closed valve 52, the resulting pressure increase in the passage 60 is exerted on the piston 26 forcing the latter downwardly to continue the reduction of the fuel valve opening. The resulting decrease in engine speed is detected by the tachometer which lowers the land 54 to open the pilot valve 52 in a direction to allow fluid from the lower end of the cylinder 51 to escape to the low pressure area Pb until the land, by the feedback of the downward motion of the piston 50 is again recentered at the lowered value of the prime mover speed. Thus part of the flow of high pressure fluid through the reset valve to the passage 60 is diverted to the cylinder 51 thus reducing the rate of closure of the fuel valve under the control of the reset valve. Such lowering of the piston 50 is transmitted through the lever 65 thus lowering the land 63 and correspondingly closing the reset valve to reduce the oil flow to the passage 60.

The resetting action above described continues so long as the reset valve remains open to admit fluid to the passage 60. That is to say, each increment of decrease in the fuel flow results in a decrease in the engine speed which is sensed by the tachometer causing the piston 50 to be lowered through the opening of the pilot valve and the opening of the reset valve to be further reduced. Thus, the decrease in the fuel supply is continued but at a decreasing rate until the tachometer piston has been restored to a position corresponding to the speed setting of the throttle 71 and evidenced by the return of the reset valve land 63 to centered position on the port 64. Then, the fuel supply will be established at a rate for maintaining operation of the prime mover at precisely the speed selected by the throttle 71, both of the valves 52 and 61 then being closed. Since the decrease in the fuel flow to correct for a decrease in load occurs at a rate corresponding to the opening of the reset valve, the flow change will decrease progressively with the closing of this valve, thus preventing overshooting the isochronous speed during each action to correct for a change in load.

Similar resetting by the conjoint action of the tachometer and the reset valve occurs in response to an increase in load and the accompanying decrease in the prime mover speed. The motions of the parts are however reversed including initial lowering of the land 54 of the pilot valve to release oil from the cylinder 51 and allow the piston 50 to be lowered and the fuel valve to be opened under its upwardly directed biasing force. Such lowering of the piston lowers the land 63 to release oil from the passage 60 and allow the initial opening of the fuel valve under the control of the tachometer to be continued under the control of the reset valve until the latter has been restored to centered position.

The reset valve acts in a similar way in establishing each new speed selected by manual adjustment of the throttle 71. If the speed setting is increased by counterclockwise swinging of the throttle, the stop 70 is lowered thus swinging the lever 65 to lower and open the valve 61 to bleed oil out of the passage 60 and allow the fuel valve to be opened under its biasing force. The resulting increase in engine speed is detected by the tachometer which opens the valve 52 to admit oil at Pc beneath the piston 50 and initiate raising of the latter and the reset valve stem. As the engine begins to accelerate, the tachometer piston 50 previously stationary begins to move upward displacing fluid out of cylinder 51 toward cylinder 27. The ensuing motion of piston 26 and opening of the fuel valve is the difference between the bleed outward from the reset valve and the displacement from cylinder 51 by tachometer piston 50. Such joint action under the control of the valves 52 and 61 continues until the fuel supply has been increased sufficiently to maintain operation of the prime mover at the newly selected speed at which time the reset valve and also the tachometer valve will be closed with the piston 50 disposed in a position corresponding to the newly selected speed.

It will be observed that true isochronous operation of the prime mover at different speeds is achieved by selective setting of the reset valve instead of the speeder spring 46 as has been conventional heretofore in isochronous speed governors. By thus divorcing the manually operable speed selector from the flyweights and the speeder spring, these parts coact with the servo 50, 51 to form a simple speed sensor or tachometer having an output member, the piston rod 48, whose position at all times corresponds to the prevailing speed of the prime mover regardless of the prevailing speed setting of the throttle 71.

The present invention takes advantage of the foregoing characteristic to utilize the governor, with the addition of only a few parts, as an acceleration regulator at proper times, that is to say, to automatically sense large increases in the setting of the speed selector 71 and then control the ensuing fuel increase to produce a preselected schedule to which the prime mover may be operated safely and without danger of damage by overheating. The need for such limitation of the fuel supply arises for example in the operation of a modern gas turbine when the speed selector is moved suddenly to substantially increase the speed setting, the governor then attempting to increase the fuel supply at greater than the permissible rate.

The above described tachometer may be utilized as the primary element in the measurement of the acceleration by virtue of the following characteristics. During the transitions between steady state speed levels the position of the tachometer piston 50 corresponds very closely to the instantaneous speed of the prime mover, its velocity is proportional to engine acceleration and the volumetric flow rate produced by the velocity of piston 50 is therefore proportional to engine acceleration. As a consequence of transmitting the motion of the piston to the reset valve 61 through the lever 65, the flow rate through this valve constitutes an acceleration reference in the following sense. The rate of motion of fuel valve piston 26 in the decrease fuel direction is proportional to the difference between the upward displacement rate of piston 50 and the flow rate out by way of reset valve 61. A downward movement of valve 61 from an initially closed steady-state condition will cause a corresponding flow rate out of cylinder 27 and the fuel valve piston 26 will assume a corresponding fuel increasing velocity. The increase in fuel thereby produced will cause the engine to begin to accelerate.

Tachometer piston 50 will move with a velocity in correspondence with engine acceleration producing a flow toward fuel valve piston 26. When the acceleration rate produced by increasing fuel produces a flow rate from piston 50 toward piston 26 which is equal to the flow rate away from piston 26 by way of the reset valve 61, the fuel valve piston velocity will become zero and increase in fuel will stop; if the acceleration rate is higher, the velocity of the fuel valve will become negative and fuel will be decreased. The engine acceleration produced under this condition is clearly a function of the flow rate out of the reset valve 61 only, and therefore, the reset valve opening, any deviation in the engine acceleration from this condition of balance producing a corrective velocity in fuel valve motion which will rapidly correct deviations in engine acceleration from the value established by the reset valve. In the case of an engine which will accelerate at a constant rate, with a fixed fuel valve opening, a fixed reset valve 61 opening will produce a constant engine acceleration rate. In the case of engines (such as the gas turbine) requiring a progressively increasing fuel rate to produce a constant engine acceleration, as the engine speed rises, the acceleration rate will decrease slightly with a fixed reset valve 61 opening as the engine speed rises. This effect is small and practically negligible so that it is closely and practically accurate to say that the engine acceleration rate is instantaneously (with small error) a function of the reset valve 61 opening only, except for a very short initial transient interval when initially passing into the acceleration phase of control action.

It is now established that an instantaneous acceleration measurement is produced by the velocity of the tachometer piston 50, that an acceleration reference has been established in the magnitude of opening of the reset valve, that an error signal is generated in the difference between tachometer piston velocity and reset valve flow rate which corrects the power medium to correct the acceleration rate error to zero.

It now remains to show how the function of the reset valve is transformed from its function of producing isochronous speed control in the speed governing phase of operation to its function of constituting an acceleration reference in the acceleration regulating phase of operation, and how it is then manipulated as a function of appropriate variables to control the acceleration of the engine and then again returned to its steady-state function. In carrying out this aspect of the invention, provision is made for withdrawing the reset valve 61 from steady-state control by the speed selector 71 after the speed selector has moved a limited distance, and transferring the control to a second stop 80 responsive to speed of the prime mover and arranged to act on the reset valve to regulate the acceleration of the prime mover to the newly selected speed.

The desired limiting action is achieved by disposing the stop 80 in the path of movement of the speed reference lever 65 for abutting engagement with the latter after a short speed-increasing adjustment of the speed selector stop 70 and separately transmitting the speed-increasing movement of the tachometer to the stop 80 and toward the lever 65 until the prime mover has accelerated into the vicinity of the newly selected speed as evidenced by reengagement of the lever with the stop 70. To these ends, the stop 80 is disposed adjacent the stop 70, and, in this instance, fixed to one end 81 of lever 82 extending generally parallel to the lever 65 and fulcrumed at 83 intermediate its ends. The opposite end of the lever is pivotally connected at 84 to an extension of the rod 48 of the tachometer piston 50 so that during acceleration the stop 80 will be moved relative to the stop 70 in the direction of the speed-increasing movement of the latter. That is to say, after retraction of the stop 70 in the speed-increasing direction by the selector 71, the lever 65 will, under the action of the spring 68, come against and become positioned by the stop 80, the stop 70 moving on and away from the lever to the newly selected speed setting. The reset valve 61 is thus withdrawn from control by the speed selector and placed under the control of the acceleration limit stop coacting with the tachometer.

During steady-state operation of the prime mover, the acceleration stop 80 will be spaced away from the stop 70 a distance $x$ which, as will presently appear, determines initially the rate of fuel increase resulting from the upward motion of piston 26 and subsequently the rate of engine acceleration as the piston 50 rises and displaces fluid out through reset valve 61. The difference between the fluid displaced out of cylinder 51 and that displaced out through reset valve 61 regulating the position of piston 26 to control the rate of fuel flowing to the engine and then by producing the required engine accelerator rate. Such spacing will be adjusted to suit the permissible acceleration rate of the prime mover being controlled, which ordinarily will be on the order of 1 percent to 30 percent per second according to the initial speed level. In the present instance, this distance is shortest at low engine speeds and increases progressively with such speed because, the fulcrum 83 is positioned along the lever 82 to transmit the tachometer motion to the reset valve 61 through the acceleration stop 80 at a somewhat greater rate than this motion is transmitted to the valve through the lever 65. To provide this difference in the ratios of the levers 65 and 82, the fulcrum 83 is offset a distance $y$ to the left of a vertical line 85 through the pivot 66 of the lever 65 thus making the left end portion of the lever 82 shorter than the corresponding portion of the lever 65.

As pointed out above, the rate of acceleration of the prime mover during an increase in fuel is determined by the rate of flow, bleeding in this instance, of oil through the reset valve 61. Therefore, to provide for acceleration of the prime mover in accordance with an optimum safe schedule for a particular prime mover, it is only necessary to locate the stop 80 in a position for each different engine speed that will provide the proper opening of the reset valve. Where the acceleration rate may vary linearly with the speed increase, the desired schedule may be achieved by properly adjusting the position of the fulcrum 83 and the stop 80, the latter being effected through suitable means such as the screw mounting $80^a$ shown.

Considering now the operation in limiting fuel in accordance with the preselected schedule, let it be assumed that while the engine is operating steady-state with the parts in the equilibrium positions shown in FIG. 1, the throttle 71 is quickly turned counter-clockwise through a substantial angle to set the stop 70 in a new position corresponding to a desired increased speed. In this movement, the selector stop 70 is lowered below the stop 80 whose position then corresponds to the then prevailing speed of the prime mover. The resulting lowering of land 63 opens the reset valve 61 an amount corresponding to the distance $x$ at the prevailing prime mover speed thus initiating bleeding of fluid out of the passage 60 and allowing corresponding upward movement of the piston 26 under the biasing force thereon, movement of the tachometer piston 50 at this time being prevented by virtue of the closure of the pilot valve 52 since the speed has not yet changed.

Under this increased fuel supply, the engine starts to accelerate and the speed increase is detected by the action of the flyweights which raise the land 54 and open the pilot valve 52 to admit pressure fluid Pc into the lower end of the cylinder 51 thus raising the piston 50 a distance corresponding to the speed increase. The fluid thus displaced out of the upper end of this cylinder supplies part or all of the flow permitted to bleed out of the passage 60 through the reset valve. As a result, the flow out of the cylinder 27 is reduced and regulated thereby thus regulating the rate of motion of the fuel valve to produce the acceleration demanded by the reset valve. The continued upward or speed increasing movement of the piston 50 rocks the lever 65 clockwise about the stop 80 as a fulcrum thus tending to raise the land 63 to correspondingly close the reset valve and decrease the rate of bleeding of oil out of the passage 60. At the same time, however, this motion is counteracted by the transmission of the tachometer output to the stop 80 through the lever 82 and lowering of the stop and the land 63 by fulcruming of the lever about the pivot 67. The resultant of these opposing actions is to increase the reset valve opening progressively, requiring an increasing acceleration rate with rising speed so long as the lever 65 remains in contact with the acceleration stop 80 and the latter is effective in controlling the action of the reset valve.

The downward movement of the valve stem 62 resulting from the speed-increasing movement of the limit stop 80 by the tachometer servo occurs at a more rapid rate than the simultaneous upward movement of the stem transmitted from this servo through the lever 65. Such increasing acceleration is required in the operation of modern gas turbines which will consume more fuel without danger of overheating as the speed and therefore the delivery of air by the compressor increases.

Finally, when the prime mover has been accelerated to a speed in the vicinity of that selected by the throttle 71, the stop 80 will have been lowered to the level of the stop 70 which takes over the control of the reset valve which is still open in the fuel-increasing direction. The fuel supply and prime mover speed then continue to increase under the control of the valve 61, the same as during the correction for speed changes during steady-state operation as above described. The reset valve thus remains open but closes progressively as the prime mover speed continues to increase with decreasing acceleration until a speed corresponding to the speed setting of the throttle is attained, the land 63 then becoming centered on the port 64.

If, at any time during a period of acceleration under the control of the stop 80, the prime mover fails to accelerate quite as fast as the scheduled rate determined by the motions transmitted to the reset valve from the piston 50 through the levers 65 and 82, the rate of displacement of fluid into the passage 60 will be reduced below the flow permitted through the reset valve at its prevailing opening. As a result, the biasing force on the fuel valve piston forces the piston 26 upwardly to make up the permissible flow through the reset valve. The velocity of the fuel valve opening is thus increased sufficiently to compensate for this difference in flow. This increase in fuel flow and hence engine acceleration continues until the system is back on the required schedule.

In a similar but reverse way, the fuel flow to the prime mover is decreased in the event that the rate of acceleration increases above the established schedule. In response to such an excessive acceleration rate, the oppositely acting actuator levers 65 and 82 coact to initiate reduction of the opening of the reset valve 61 thus causing more of the prevailing tachometer piston displacement to be supplied to the fuel valve piston 26. As a result, the piston 26 is forced downwardly against its bias, thus further closing the fuel valve enough to compensate for the excessive prime mover acceleration above the preselected schedule.

It is apparent from the foregoing that during acceleration of the prime mover while the reset valve 61 is under the control of the stop 80, the flow of fluid through the valve, out-flow in the present instance, is distributed between the tachometer and fuel servos by the action of the pilot valve 52 which responds to changes in the prime mover speed and causes movement of the piston 50 at a rate corresponding to the prime mover acceleration. Therefore, deviations in the pilot valve opening from that corresponding to the predetermined acceleration rate will increase or decrease the fuel flow until the acceleration rate has been returned to the preselected schedule. The fuel flow and acceleration rate is thus controlled and maintained at the desired value as the prime mover approaches the newly selected speed when the speed selector stop 70 takes over and decreases the acceleration rate until the prime mover reaches the manually selected speed.

For certain prime movers, particularly gas turbines, it is desirable to vary the acceleration rate non-linearly at least in certain parts of the speed range of the prime mover. Such a change in the acceleration schedule may be achieved by correspondingly varying the ratio of transmission of the tachometer motion to the reset valve 61 automatically with changes in the position of the piston 50 and therefore in the prime mover speed. This may be accomplished as shown in FIG. 2 by interposing a cam 95 in the connection between the piston rod 48 and each of the levers 65 and 82, which, as above described, apply the motions of the piston 50 in opposite directions to the reset valve stem when the latter is under the control of the acceleration stop 80. The cam is on a shaft 97 rotatable about a fixed axis and carrying a pinion 98 in mesh with rack teeth on the piston rod. A follower 96 is on the end of the lever while a follower 96$^b$ also riding the cam is on an offset end portion 96$^a$ of the lever 65. The periphery of the cam is contoured to produce the desired variations in the acceleration schedule in any portion of the speed range.

In a manner similar to the action of the acceleration limit stop 80, the rate of deceleration of the prime mover following a sudden and substantial decrease in the speed setting of the governor by the selector 71 may be limited in accordance with a predetermined schedule so as to avoid the danger of flame-out in the case of a gas turbine. Such limiting of the rate of fuel decrease is controlled by a stop 90 which, like the stop 80, is normally spaced from the lever 65 during steady-state operation by a distance $w$ in the speed-decreasing direction. This deceleration stop is disposed adjacent the speed selecting stop 70 but on the opposite side of the lever 65 and is adjustably mounted as through a screw 94 on one end of a lever 91 extending generally horizontally and swingable about a fulcrum 92 intermediate to its ends. The other end of the lever is pivotally connected at 93 to the piston rod 48 or output member of the speed sensor.

With some prime movers such as gas turbines, it is desirable to decrease the rate of deceleration as the speed decreases. To this end, the motion of the tachometer rod 48 is transmitted to the stem of the reset valve at a lower rate from the stop 90 than the same motion is applied to the stem of the reset valve from pivot 67 through the lever 65. This is accomplished by spacing the fulcrum 92 to the right of the line 85 a distance $z$ which is adjusted to provide the desired rate of deceleration decrease by closing the reset valve progressively as the speed is being decreased under the control of the stop 90.

In operation, the deceleration stop is placed in control of the reset valve by sudden and substantial clockwise swinging of the throttle 71 to raise the stop 70 to the position at which the lever 65 comes into abutment with the stop 90. Movement of the throttle 71 after the lever 65 comes against the stop 90 is permitted by yielding of the spring 76, thus allowing the throttle to move to any desired new decreased speed setting. The movement of the lever to the stop 90 raises the land 63 of the reset valve thus admitting fluid at the high pressure Pc to the passage 60 to initiate downward movement of the fuel servo piston since the piston 50 is maintained in fixed position by virtue of the closure of the pilot valve 52, the speed being initially constant. The tachometer responds to this initial decrease in fuel and therefore speed by lowering the land 54 to release fluid from the lower end of the cylinder 51 and absorb part or substantially all of the increased flow in the passage 60. The closing of the fuel valve is slowed down and, as a result of the transmission of the tachometer motion to the reset valve in opposite directions by the levers 65 and 91, the valve is maintained open to continue the progressive closing of the fuel valve. Such closing, however, is at a decreasing rate because of the greater ratio of motion transmission through the lever 65.

Finally, after the stop 90 has moved upwardly far enough to traverse the yield interval between stop 90 and the speed selector stop, the control of the reset valve will revert to the speed selector stop 70 as the stop 90 recedes from contact with lever 65. The fuel supply adjustment is then continued under the control of the stop 70 the same as during steady-state operation until the prime mover speed has been reduced, at a progressively decreasing rate, to that corresponding to the setting of the stop 70 as the land of the reset valve again becomes centered on the port 64.

In the control of certain prime movers, by the regulator above described, particularly some gas turbines, it is desirable to confine the fuel regulating action during acceleration to speeds above a predetermined idling value. In order to suitably control the fuel supply during starting when the acceleration control above described may not be suitable, it is disabled. Such disabling of the acceleration control and independent regulation of the fuel supply may be effected by modifying the structure above described in the manner shown in FIG. 3 including the provision of a valve 107 which, when open, overrides the reset valve 61. Opening and closing of the valve 107 is controlled in the present instance by a lever 115 swingable about a fixed fulcrum 116 intermediate its ends and pivotally connected at one end 117 to an extension 118 of the lever 82 whose position corresponds at all times to the prevailing speed of the prime mover. The other end 120 of the lever is disposed in the path of downward or fuel decreasing movement of the valve rod 105 so as to interrupt the downward movement of the rod and initiate opening of the valve 107 against the spring 108 and the pressure in the cylinder 27 at a predetermined speed of the prime mover.

In operation, when the speed selector is disposed in a position for starting the prime mover, the lever 65 will be against the stop 70 and holding the land 63 of the reset valve above the port 64. This allows high pressure fluid to flow into the passage 60 thus forcing the fuel servo piston 26 downwardly and closing the fuel valve to the minimum flow stop. But at this time, the rod 105 is in abutment with the lever 115 with valve 107 open and draining the flow supplied by the reset valve. Control of the fuel servo by the reset valve 61 is thus disabled and the fuel servo follows the valve 107 thus moving upwardly to open the valve at a rate determined by the tachometer. Therefore, at speeds below that at which the rod 105 comes into abutment with the lever 120, the flow of fuel to the prime mover is scheduled independently of the prime mover acceleration and only as a function of the prime mover speed. Suitable fuel is thus made available for starting the prime mover and bringing it up to and within the range where control of the acceleration rate is suitable.

Under certain abnormal conditions in the turbine, it is possible that it will fail to accelerate normally in response to an increase in the fuel supply controlled by an acceleration regulating control of the character above described. Continued increase in the fuel under such conditions will result in stall or overheating and damage to the turbine. To prevent this, the invention, in another of its aspects, contemplates modifying or disabling the acceleration control and automatically limiting the fuel supply to a safe value whenever the engine fails to accelerate normally.

In the form shown herein, this is accomplished through the provision of another stop 113 (see FIG. 3) positioned by a stop in the form of a screw 100 on one end of a lever 110 fulcrumed intermediate its end on an extension 101 of the lever 82. The opposite end of the lever supports a vertically slidable rod 112 whose upper end forms the stop 113 for abutment with the lever 65. The stop screw 100 abuts one end of a lever 102 paralleling the levers 65, 82 and 110 and swingable about a fixed fulcrum 103 near its opposite end. The latter is pivotally connected at 104 with a part 104ᵃ which moves back and forth with the fuel valve piston 26. In response to clockwise swinging of the lever 110 by the stop 100, the lever 65 is swung counter-clockwise causing a closing of the reset valve 61 and thereby limiting the fuel flow to the prime mover.

In operation, let it be assumed that in response to lowering of the selector stop 70 and transferring the control of the reset valve 61 to the acceleration stop 80 thus opening this valve, the prime mover accelerates properly and according to the preselected acceleration schedule. The extension of the lever 82 at point 101 and the fulcrum 111 will move downward. The upward motion of the fuel valve lowers the stop 100 by way of lever 102. The left end of lever 110 is thereby constrained to move downward with increasing speed and upward with increasing fuel. The linkage is so proportioned that with the normal increase in the fuel flow to the turbine under the control of the acceleration stop 80, the stop 113 will move downward ahead of the lever 65 and remain out of engagement with the latter as shown in FIG. 3.

If, however, the prime mover fails to accelerate properly, the position of the fulcrum 111 of the lever 110 remains substantially fixed so that in the continued upward and fuel-increasing movement of the piston 26, the resulting clockwise rocking of the lever 102 is transmitted to the lever 110 through the stop 100. Such clockwise rocking raises the rod 112 thus rocking the lever 65 counter-clockwise about the pivot 67 and away from the acceleration stop 80. The latter is thus taken out of control, and, as a result, the reset valve 61 is eventually closed thereby interrupting the increase in fuel supply. Whenever the prime mover starts to accelerate properly and follow the fuel increase, such for example as after a temporary interruption in the fuel supply, the stop 100 will be lowered along the rod 112 to allow the lever 65 to come back against the stop 80 and the latter to resume control of the reset valve in causing the preselected acceleration schedule to be executed.

In the operation of gas turbine engines under varying conditions of atmospheric temperature and pressure, it is required to vary the acceleration rate in accordance with the changing values of such parameters. For example, with an increase in the pressure P2 of the air at the inlet 12 of the turbine casing, it is desirable to increase the rate of acceleration of the turbine. Similarly, with an increase in the temperature T2 at this inlet, the permissible safe acceleration rate should be decreased.

The apparatus above described may, by the simple modifications shown in FIG. 4, be adapted to achieve such automatic alteration of the fuel limit schedule. In this connection, it will be remembered that the width of the gap $x$ prevailing at any time during the start of an acceleration period determines the initial acceleration rate and increases in width as the engine speed increases. This is because the fulcrum 83 of the lever 82 is displaced a distance $y$ to the left of the fulcrum 66 of the lever 65. Thus, at any given speed and corresponding position of the tachometer piston 50, increasing the distance $y$ will increase the acceleration gap $x$.

Accordingly, if it is desired to increase and decrease the acceleration rate with changes in engine inlet pressure P2, it is only necessary to mount the fulcrum 83 as on a rod 130 (FIG. 4) for movement along the lever 82 and couple the same to the free end 131 of an evacuated bellows 133 loaded by a spring 13 and disposed within a chamber 134 communicating through a pipe 135 with the air inlet of the turbine. As the pressure P2 increases and decreases, the bellows contracts and expands thus shifting the fulcrum to the right and left respectively to correspondingly vary the distance $y$ and the ratio of the lever 82.

With the linkage arrangement above described, the motion resulting from a change in a parameter affecting the operation of the turbine may be introduced at another point, namely in the feedback linakge of the speed measuring tachometer. Thus, by moving the fulcrum 44 to the left and toward the bearing 42, the moment of the force of the speeder spring 46 with respect to the force developed by the flyweights 36 is increased resulting in a shorter travel of the tachometric piston 50 for a given speed change. The position of the tachometer piston 50 at low speed is always the same, so that when the travel range is shortened the upper portion is not used. Therefore, since the acceleration gap increases as the piston 50 moves upwardly, it follows that the gap $x$ is less at any given speed. Accordingly, moving the fulcrum 44 to the left will result in slower acceleration at the same instantaneous speed.

Any suitable engine parameter may be sensed and changes in its value applied to the fulcrum 44. For example, the modifying parameter is the temperature T2 in the turbine inlet 12. In the present case, a fluid filled bellows 136 (FIG. 4) fixed at one end to the casing 29 senses engine inlet air temperature and is connected at its free end 137 to the fulcrum 44 to move the latter to the left and decrease the acceleration rate as the inlet temperature goes up. This has the advantage of causing the position of the tachometer to indicate the so-called "corrected" speed, $N/\sqrt{\theta_2}$, where $\theta_2$ is the ratio of the engine inlet temperature to the "standard" value, 518.7° Rankine. The varying position of the piston 50 may also be utilized to perform the additional function, in turbines having inlet guide vanes, of adjusting such vanes automatically according to some desired function of the so-called corrected speed.

It will be apparent that with the regulator described above, the all-speed governor which controls the steady-state operation of the prime mover is at proper times converted automatically into an acceleration sensor and then utilized to perform the different function of limiting the fuel supply in accordance with a preselected and safe operating schedule. The structure required for providing safe operation is thus greatly simplified as compared to prior controls requiring the measuring of several parameters affecting the prime mover operation and the computation from such measurements of a safe operating fuel schedule. By limiting the fuel supply directly in accordance with prime mover acceleration, a desired acceleration schedule is maintained irrespective of the widely varying heating values of the fuel that may be used or the presence or absence of preheaters for the compressor discharge air used in the prime mover. Therefore, the improved regulator is not only simpler and less expensive in construction but far more versatile in its application than prior constructions intended to perform similar fuel limiting functions.

While the exemplary embodiment of fluid pressure actuators and valve type control devices are preferred for the sake of simplicity of structure, the invention, in its various aspects, is not limited to the use of such components but contemplates the use of electrical or mechanical equivalents of the components. Accordingly, I do not intend to limit the invention by the present exemplary disclosure but contemplate the inclusion of all equivalent and alternative constructions falling within the spirit and scope of the invention as expressed in the appended claims.

I claim as my invention:

1. The combination of, a valve part movable back and forth to regulate the flow of fuel to a prime mover, a first fluid servo having a first cylinder and a first piston slidable therein and coupled to said valve part, means biasing said piston and valve part in one direction, a second fluid servo having a second piston slidable in a second cylinder, a passage connecting one end of said cylinders for movement of said first piston against said biasing means and in response to flow changes in the passage, a speed sensor including a valve member movable back and forth across a centered closed position to respectively admit pressure fluid to and release the same from the other end of said second cylinder, a feedback connection for transmitting a differential force, which is a function of the position of said second piston, back to said valve member to restore the same to said centered position to constitute said sensor and said second servo a speed measuring tachometer whereby the velocity of said second piston corresponds closely to acceleration of the primer mover, a reset valve having elements relatively movable back and forth across a centered closed relation to respectively admit pressure fluid to and release the same from said passage, a movable stop normally abutting one of said elements, manually operable means for adjusting said stop and the prime mover speed at which said centered relation is restored following a speed change of the prime mover, and means transmitting the motions of said second piston to one of said elements in directions to restore said centered relation and thereby provide for isochronous operation of the prime mover at each speed setting of adjusting means.

2. For regulating the speed of a prime mover, the combination of, a fuel regulator biased in one direction and movable back and forth to vary the speed of a prime mover, a servo having a first fluid filled cylinder and a first piston slidable therein and coupled to said regulator to position the latter in accordance with flow changes in said first cylinder, a tachometer responsive to changes in the prime mover speed and having an output member disposed at all times in a position corresponding to the prevailing value of said speed, said member comprising a second piston slidable in a second cylinder defining a fluid filled passage communicating with said first cylinder, a reset valve having coacting elements relatively movable back and forth across a centered closed relation to respectively admit pressure fluid to or release the same from said passage in accordance with the displacement of said elements in opposite directions away from said centered relation, a manually operated speed selector movable back and forth to select different desired values of the prime mover speed, and mechanism differentially combining the movements of said speed selector and said second piston and applying the resultant to said valve elements to change the flow in said passage in corresponding directions and continue the change in fuel flow until the elements have been restored to said centered relation at the speed value established by said selector.

3. The combination of a regulator movable back and forth to vary the flow of fuel to a prime mover and biased in one direction, a first fluid servo having a first cylinder and a first piston slidable therein and coupled to said regulator to vary the position thereof with changes in the pressure in said first cylinder, a second fluid servo having a second piston slidable in a second cylinder, a fluid filled passage connecting said first cylinder and one end of said second cylinder for movement of said first and second pistons selectively in response to flow changes in the passage, a device sensing changes in the speed of said prime mover including a valve member movable back and forth across a centered closed position to respectively admit pressure fluid to and release the same from the other end of said second cylinder, a feedback connection for transmitting the motion of said second piston back to said valve member to restore the same to said centered position in response to movement of said second piston whereby to constitute said sensing device and said second servo a tachometer in which the velocity of said second piston corresponds closely to acceleration of the prime mover, a reset valve having elements relatively movable back and forth across a centered closed relation to respectively admit pressure fluid to and release the same from said passage in accordance with the displacement of said elements in opposite directions away from said centered relation, a manually operable speed selector movable back and forth to select different desired values of the prime mover speed, and mechanism differentially combining the movements of said speed selector and said second piston and applying the resultant to said valve elements to change the fluid flow in said passage in corresponding directions and continue the change in fuel flow until the elements have been restored to said centered relation at the speed value established by said selector.

4. An isochronous governor as defined in claim 3 in which the motion of said speed selector is communicated to one of said valve elements through a selector stop against which the element is biased.

5. An isochronous governor as defined in claim 4 including an acceleration limit stop spaced from said selector stop during steady-state operation of the prime mover and adapted, during speed-increasing movement of said selector stop, to abut said one valve element and limit the opening of said reset valve in the speed increasing direction and therefore the resulting rate of speed-increasing movement of said regulator, and means transmitting the resulting speed-increasing movement of said second piston to said acceleration stop to retract the latter toward said selector stop whereby to continue the speed-increasing movement of said regulator and acceleration of the prime mover at a limited and controlled rate until said valve element again comes into abutment with said selector stop.

6. A combined isochronous speed governor and acceleration control as defined in claim 5 including manually operable means for selectively adjusting the spacing of said selector and acceleration stops and therefore the extent of opening of said reset valve in response to a speed-increasing adjustment of said selector stop.

7. A combined isochronous speed governor and acceleration control as defined in claim 5 including means automatically responsive to changes in the position of said second piston and operable during a period of prime mover acceleration to vary the ratio of motion transmission between the second piston and said reset valve whereby to correspondingly change the acceleration schedule controlled by said acceleration stop.

8. A combined isochronous governor and acceleration control as defined in claim 5 in which the motion of said second piston is transmitted to said acceleration stop at a more rapid rate than to said reset valve whereby to increase the permissible rate of acceleration of the prime mover during the speed-increasing movement of said regulator under the control of said acceleration stop.

9. A combined isochronous governor and acceleration control as defined in claim 5 in which the movements of said second piston are applied to said reset valve in opposite directions during a period of prime mover acceleration under the control of said acceleration stop.

10. A combined isochronous governor and acceleration control as defined in claim 5 in which the movements of said second piston are applied to said reset valve through the medium of levers.

11. A combined isochronous governor and acceleration control as defined in claim 5 in which the motions of said second piston are transmitted to said reset valve and said acceleration stop through levers having different motion transmitting ratios.

12. A combined isochronous speed governor and acceleration control as defined in claim 11 including means selectively operable to vary the motion transmitting ratio of one of said levers.

13. An isochronous governor as defined in claim 4 including a deceleration limit stop spaced from said selector stop during steady-state operation of the prime mover and adapted, during speed-decreasing movement of said selector stop to abut and interrupt the movement of said one valve element and limit the opening of said reset valve in the speed-decreasing direction and therefore the rate of the resulting speed-decreasing movement of said regulator, and means transmitting the resulting speed-decreasing movement of said second piston to said deceleration stop and move the latter toward said selector stop whereby to continue the speed-decreasing movement of said regulator and deceleration of the prime mover at a limited and controlled rate until said valve element again comes into abutment with said selector stop.

14. A combined isochronous governor and deceleration control as defined in claim 13 in which the motion of said second piston is transmitted to said deceleration stop at a lesser rate than to said reset valve whereby to decrease the rate of deceleration of the prime mover during the speed-decreasing movement of said regulator under the control of the deceleration stop.

15. The combination of a fuel regulator movable back and forth to vary the speed of a prime mover and biased in one direction, a fluid servo having a first fluid filled cylinder and a first piston slidable therein and coupled to said regulator to position the latter in accordance with pressure changes in said first cylinder, a tachometer including a reversible power actuator with an output member and a device for sensing changes in the speed of the prime mover and controlling the operation of said actuator to position said member at all times in accordance with the prevailing speed of the prime mover, means including a second piston movable with said output member and defining a fluid filled passage communicating with said first servo cylinder, a reset valve having coacting elements relatively movable back and forth across a centered closed relation to respectively admit pressure fluid to or release the same from said passage, manually operable speed selecting means for adjusting said reset valve to vary the fluid in said passage and thereby initiate a change in the position of said first piston and the prime mover speed, and means for transmitting the motion of said output member resulting from the prime mover speed change to said reset valve in a direction to continue the speed change until the latter has been returned to a value corresponding to the setting of said selecting means.

16. The combination of a fuel regulator movable back and forth to vary the speed of a prime mover, an all-speed governor including a power servo operable in response to detected changes in the speed of the prime mover to vary the position of said regulator and compensate for changes in load causing such speed changes and a reset device operable as an incident to such load changes to restore the prime mover to its former isochronous speed, manually adjustable selector means for actuating said reset device for selectively varying the prime mover speed maintained by said governor, mechanism for controlling the operation of said reset device to vary the operation of said servo and maintain, through the action of said governor, a preselected schedule of acceleration of the prime mover, and means automatically responsive to a speed increasing adjustment of said selector means to withdraw the control of the reset device from the selector means and transfer such control to said mechanism until the prime mover has been accelerated to a speed correspondinng to the setting of the selector means and then transfer the control of the reset device back to said selector means and governor.

17. A prime mover fuel control as defined in claim 16 including means for detecting failure of the prime mover to respond to an increase in fuel supply under control of said mechanism and operating to limit the fuel supply to a safe value at each prime mover speed.

18. A prime mover fuel control as defined in claim 16 including means for disabling said mechanism below a predetermined prime mover speed and coacting with said governor to regulate the fuel supply as a function of the prime mover speed.

19. The combination of a fuel regulator movable back and forth to vary the speed of a prime mover, an all-speed governor including a power servo operable in response to detected changes in the speed of the prime mover to vary the position of said regulator and compensate for changes in load causing such speed change and a reset device operable as an incident to such load changes to restore the prime mover to its former isochronous speed, manually adjustable means for actuating said reset device for selectively varying the prime mover speed maintained by said governor, and means operating automatically as an incident to a substantial increase in the speed setting of said governor by said selector to convert the governor into a mechanism for sensing changes in the ensuing acceleration of the prime mover.

20. A combined speed governor and acceleration sensor as defined in claim 19 including means operable by said mechanism to regulate the acceleration of the prime mover in accordance with a predetermined schedule until the prime mover has attained a speed corresponding to the prevailing setting of said speed selector.

21. The combination of a regulator movable back and forth to vary the flow of fuel to a prime mover and biased in one direction, a first fluid servo having a first cylinder and a first piston slidable therein and coupled to said regulator to vary the position thereof with changes in the fluid flow in said first cylinder, a second fluid servo having a second piston slidable in a second cylinder, a fluid filled passage connecting said first cylinder and one end of said second cylinder for movement of said first piston in response to flow changes in the passage, a device sensing changes in the speed of said prime mover including a rotatably mounted flyweight, a speeder spring opposing the force developed by the flyweight, a valve member coupled to said flyweight and movable thereby back and forth across a centered closed position to respectively admit pressure fluid to and release the same from the other end of said second cylinder, a feedback connection varying the stressing of said speeder spring in accordance with the movement of said second piston and in a direction to restore said valve member to said centered position whereby to constitute said sensor and said second servo a tachometer in which the position of said second piston corresponds closely to the speed of the prime mover and the velocity of such piston corresponds closely to acceleration of the prime mover, a reset valve having elements relatively movable back and forth across a centered closed relation to respectively admit pressure fluid to and release the same from said passage in accordance with the displacement of said elements in opposite directions away from said centered relation, a manually operable speed selector movable back and forth to select different desired values of the prime mover speed, mechanism differentially combining the movements of said speed selector and said second piston and applying the resultant to said value elements to change the fluid flow in said passage in corresponding directions and continue the change in fuel flow until the elements have been restored to said centered relation at the speed value established by said selector, a parameter sensing member movable back and forth with changes in a parameter affecting the operation of a prime mover, and means for transmitting the movements of said sensing member to said flyweight through said speeder spring and feedback connection and thereby modify the fuel flow schedule independently of said speed selector.

22. An isochronous speed governor as defined in claim 21 in which the motion for restoring said valve member to said centered position is fed back to said flyweight through a lever whose motion transmitting ratio is adjusted automatically by said parameter sensing member.

23. The combination of, a regulator movable back and forth to vary the flow of fuel to a prime mover and biased in one direction, a first fluid servo having a first cylinder and a first piston slidable therein and coupled to said regulator to vary the position thereof with changes in the fluid flow in said first cylinder, a second fluid servo having a second piston slidable in a second cylinder, a fluid filled passage connecting said first cylinder and one end of said second cylinder for movement of said first piston in response to flow changes in the passage, a device sensing changes in the speed of said prime mover including a valve member movable back and forth across a centered closed position to respectively admit pressure fluid to and release the same from the other end of said second cylinder, feedback means for restoring said valve member to said centered position in response to movement of said second piston whereby to constitute said sensor and said second servo a tachometer in which the position of said second piston corresponds closely to the speed of the prime mover and its velocity corresponds closely to acceleration of the prime mover, a reset valve having elements relatively movable back and forth across a centered closed relation to respectively admit pressure fluid to and release the same from said passage in accordance with the displacement of said elements in opposite directions away from said centered relation, a manually operable stop movable back and forth to select different desired values of the prime mover speed, mechanism differentially combining the movements of said speed selector stop and said second piston and applying the resultant to said valve elements to change the fluid flow in said passage in corresponding directions and continue the change in fuel flow until the elements have been restored to said centered relation at the speed value established by said selector, an acceleration limit stop spaced from said speed selector stop during steady-state operation of the prime mover and adapted, during speed-increasing movement of said selector stop, to abut said one valve element and limit the opening of said reset valve in the speed-increasing direction and therefore the resulting rate of speed-increasing movement of said regulator, a connection transmitting the resulting speed-increasing movement of said second piston to said acceleration stop to retract the latter toward said selector stop whereby to continue the speed-increasing movement of said regulator and acceleration of the prime mover at a limited and controlled rate until said valve element again comes into abutment with said selector stop, a second member movable back and forth with changes in a parameter affecting the operation of a prime mover, and means coupling said second member and said connection to vary the motion transmitting ratio of the latter and modify the acceleration limit schedule with changes in said parameter.

24. A combined isochronous speed governor and acceleration limiter as defined in claim 23 in which the connection for adjusting said acceleration stop includes a lever whose motion transmitting ratio is varied by movement of said parameter sensing member.

25. The combination of, a regulator movable back and forth to vary the flow of fuel to a prime mover and biased in one direction, a first fluid servo having a first cylinder and a first piston slidable therein and coupled to said regulator to vary the position thereof with changes in the fluid flow in said first cylinder, a second fluid servo having a second piston slidable in a second cylinder, a fluid filled passage connecting said first cylinder and one end of said second cylinder for movement of said first piston in response to flow changes in the passage, a device sensing changes in the speed of said prime mover including a valve member movable back and forth across a centered closed position to respectively admit pressure fluid to and release the same from the other end of said second cylinder, feedback means for restoring said valve member to said centered position in response to movement of said second piston whereby to constitute said sensor and said second servo a tachometer in which the position of said second piston corresponds closely to the speed of the prime mover and its velocity corresponds closely to acceleration of the prime mover, a reset valve having elements relatively movable back and forth across a centered closed relation to respectively admit pressure fluid to and release the same from said passage in accordance with the displacement of said elements in opposite directions away from said centered relation, a manually operable stop movable back and forth to select different desired values of the prime mover speed, mechanism differentially combining the movements of said speed selector stop and said second piston and applying the resultant to said valve elements to change the fluid flow in said passage in corresponding directions and continue the change in fuel flow until the elements have been restored to said centered relation at the speed value established by said selector, a deceleration limit stop spaced from said speed selector stop during steady-state operation of the prime mover and adapted, during speed-decreasing movement of said selector stop, to abut said one valve element and limit the opening of said reset valve in the speed-decreasing direction and therefore the resulting rate of speed-decreasing movement of said regulator, a connection transmitting the resulting speed-increasing movement of said second piston to said deceleration stop to retract the latter toward said selector stop whereby to continue the speed-decreasing movement of said regulator and deceleration of the prime mover at a limited and controlled rate until said valve element again comes into abutment with said selector stop, a second member movable back and forth with changes in a parameter affecting the operation of a prime mover, and means coupling said second member and said connection to vary the motion transmitting ratio of the latter and modify the deceleration limit schedule with changes in said parameter.

26. A combined isochronous speed governor and deceleration limiter as defined in claim 25 in which the connection for adjusting said deceleration stop includes a lever whose motion transmitting ratio is varied by movement of said parameter sensing member.

References Cited by the Examiner
UNITED STATES PATENTS

| | | | |
|---|---|---|---|
| 2,168,155 | 4/1939 | Caughey | 91—366 X |
| 2,896,652 | 7/1959 | Goetsch et al. | |
| 2,949,957 | 8/1960 | Eastman. | |
| 2,971,338 | 2/1961 | Bodemuller. | |

FREDERICK L. MATTESON, JR., *Primary Examiner.*

FREDERICK KETTERER, JAMES W. WESTHAVER,
*Examiners.*